United States Patent
Sundararajan et al.

(10) Patent No.: US 7,640,251 B2
(45) Date of Patent: *Dec. 29, 2009

(54) STRUCTURED APPROACH TO SOFTWARE SPECIFICATION

(75) Inventors: Parthasarathy Sundararajan, Chennai (IN); Krishnamoorthy Meenakshisundaram, Chennai (IN); Srinivasan Ramaswamy, Chennai (IN); Shyamala Jayaraman, Chennai (IN); Raghuram Devalla, Chennai (IN); Venkatasubramanian Ramaratnam, Chennai (IN); Natarajan Krishnan, Chennai (IN); Suresh Sathiavageeswaran, Chennai (IN); Kanappan Gopalsamy, Chennai (IN)

(73) Assignee: Rameo Systems Limited, Chennai, Tami Nadu (IN)

( * ) Notice: Subject to any disclaimer, the term of this patent is extended or adjusted under 35 U.S.C. 154(b) by 226 days.

This patent is subject to a terminal disclaimer.

(21) Appl. No.: 10/967,525

(22) Filed: Oct. 18, 2004

(65) Prior Publication Data

US 2005/0203865 A1  Sep. 15, 2005

Related U.S. Application Data

(60) Provisional application No. 60/553,087, filed on Mar. 15, 2004, provisional application No. 60/553,256, filed on Mar. 15, 2004, provisional application No. 60/553,352, filed on Mar. 15, 2004, provisional application No. 60/553,470, filed on Mar. 16, 2004.

(51) Int. Cl.
G06F 17/00 (2006.01)

(52) U.S. Cl. .......................... 707/100; 707/2; 717/104

(58) Field of Classification Search ............... 707/100, 707/101, 102, 104.1, 2; 717/160, 101, 104, 717/106
See application file for complete search history.

(56) References Cited

U.S. PATENT DOCUMENTS

2002/0049573 A1* 4/2002 El Ata ........................ 703/2
2003/0120593 A1* 6/2003 Bansal et al. ................ 705/39

(Continued)

FOREIGN PATENT DOCUMENTS

WO   03014927   2/2003

OTHER PUBLICATIONS

Introduction to WebLogic Server [Online], Mar. 1, 2004, XP002334223-Retrieved from the Internet: URL: BEAHOMEPAGE http://web.archive.org/web/20040301201936/e-docs.bea.comIWIs/docs81/intro/chap1.html [retrievedonJun. 30, 2005] The whole document.

(Continued)

*Primary Examiner*—Hosain T Alam
*Assistant Examiner*—Amy Ng
(74) *Attorney, Agent, or Firm*—Prakash Nama; Global IP Services, PLLC

(57) ABSTRACT

A method and apparatus to afford a technical application for gathering, storing, tracking, and using requirements, engineering software for those requirements, and releasing finished enterprise software. A method is described that gathers requirements into a constrained data structure designed to facilitate the engineering of pre-specified definitions of the work to be done. A data structure and schema are described that organizes the gathering of requirements, the engineering of software that meet those requirements, and the orderly release of the software components. A computer readable medium is described, the medium having computer executable instruction to cause a system perform the method.

10 Claims, 3 Drawing Sheets

U.S. PATENT DOCUMENTS

| | | | |
|---|---|---|---|
| 2003/0167455 A1* | 9/2003 | Iborra et al. | 717/105 |
| 2003/0204487 A1* | 10/2003 | Sssv et al. | 707/1 |
| 2003/0233631 A1* | 12/2003 | Curry et al. | 717/100 |
| 2004/0143470 A1* | 7/2004 | Myrick et al. | 705/7 |
| 2004/0153992 A1* | 8/2004 | Molina-Moreno et al. | 717/105 |
| 2004/0210445 A1* | 10/2004 | Veronese et al. | 705/1 |
| 2004/0225664 A1* | 11/2004 | Casement | 707/100 |
| 2005/0091093 A1* | 4/2005 | Bhaskaran et al. | 705/7 |
| 2005/0108680 A1* | 5/2005 | Cheng et al. | 717/104 |
| 2005/0166178 A1* | 7/2005 | Masticola et al. | 717/104 |
| 2007/0180432 A1* | 8/2007 | Gassner et al. | 717/136 |

OTHER PUBLICATIONS

John Beatty Etal, Next-Generation Data Programming : Service Data Objects [Online], Nov. 2, 2003, XP002334215, Retrieved from the Internet:URL:BEAHOMEPAGE http://ftpna2.bea.com/pub/downloads/commonj/Next-Gen-Data-Programming-Whitepaper.pdf, [retrievedonJun. 30, 2005] The whole document.

* cited by examiner

STRUCTURED APPROACH TO SOFTWARE SPECIFICATION

RELATED APPLICATIONS

Benefit is claimed under 35 U.S.C. 119(e) to U.S. Provisional Application Ser. No. 60/553,087, entitled "Approach for representing business architecture for information systems" by Sundararajan et al., filed Mar. 15, 2004, which is herein incorporated in its entirety by reference for all purposes.

Benefit is also claimed under 35 U.S.C. 119(e) to U.S. Provisional Application Ser. No. 60/553,256, "Approach for representing technical architecture" by Sundararajan et al., filed Mar. 15, 2004, which is incorporated herein by reference for all purposes.

Benefit is also claimed under 35 U.S.C. 119(e) to U.S. Provisional Application Ser. No. 60/553,352, "Mapping business and technical architecture elements to implementation technologies" by Sundararajan et al., filed Mar. 15, 2004, which is incorporated herein by reference for all purposes.

Benefit is also claimed under 35 U.S.C. 119(e) to U.S. Provisional Application Ser. No. 60/553,470, "Schema for storing integrated software specification" by Sundararajan et al., filed Mar. 16, 2004, which is incorporated herein by reference for all purposes.

FIELD OF THE INVENTION

This invention relates to the field of software engineering, and more specifically to a method and apparatus to structure, store, and manage specifications gathered during various phases of an information system's life cycle.

BACKGROUND OF THE INVENTION

In conventional engineering disciplines, architects consider how a building will be used when laying out overall specifications for the building. These specifications are then transformed into a set of standard construction elements. Engineers provide specifications for these elements to be used in constructing the building. Construction groups use appropriate technology and tools to actually construct the building. As an example, in a typical building project, architects use standard elements (viz., simply-supported beams, cantilevers, domes, and columns) to create an overall structure that satisfies the functional and aesthetic requirements of the building. Engineering groups use standard engineering elements (viz., I-beams, trusses, etc.) to translate the architectural specifications to engineering specifications. Construction groups use the engineering specifications along with the recommended technologies, materials and tools to complete the project (viz., concrete mix, steel, wood, welding equipment, etc.).

There have been many software engineering aids and ideas that attempted to solve the issue of structuring, storing and managing specifications created during the different phases of software lifecycle. Recently, some approaches have appeared to create an integrated approach for managing software lifecycle by integrating these islands. All these approaches suffer from the following issues: difficulty in defining standard elements to model the information captured in these various phases, difficulty in understanding the relationship between these elements while implementing the various phases, and difficulty in creating an integrated process around a central model.

Issues arise due to the fact that the representation of specifications captured across these stages need a common thread or translation semantics. Since diagram elements are varied even in a single phase and view and usage of such elements are also varied, evolving a common data model has never been achieved. The difficulty is compounded by the fact that the class of information systems specified (viz., business systems and real-time systems) require different representation mechanisms owing to the differences in implementation interpretation. Conventional attempts end up as patchwork of various aids integrated poorly.

Other requirements that need to be addressed in the current approach include the peripheral activities in the software lifecycle. These relate to configuration management, analyzing impact of changes to be made, project-management-related activities dealing with estimation, planning and control and rolling out the product and creating access profile. This requires standardized work product structure and the relations between the various elements of the work product. Lack of an integrated representation of the product structure severely affects the ability to perform all the related activities in the context of the work product.

DESCRIPTION OF PREFERRED EMBODIMENTS

Figure 1:
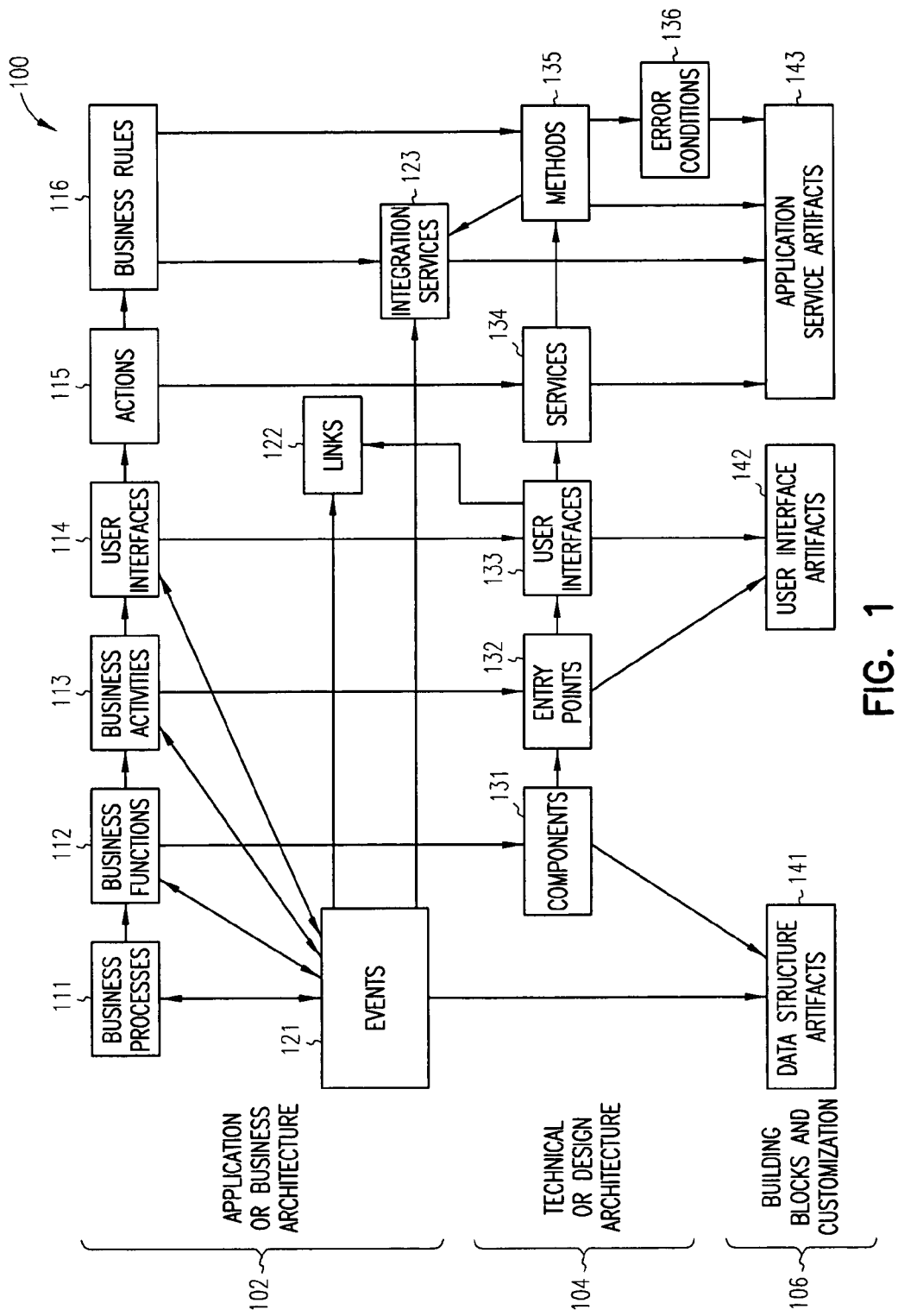
FIG. 1 is a schema 100 for gathering requirements and engineering enterprise software.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

Requirements Management:

In conventional approaches to large software system development, business analysts do not have a set of standard elements with which they can define the business architecture suitable for implementing information systems. Business processes are generally represented using "event-process chains," where functions or activities performed across the organization in the various organization units are depicted as a chain of nodes connected by event that trigger them. This approach enables business users to understand the process flows. There are no clear methodologies to create such process chains, and the levels of refinement are confusing. Moreover, this approach is complicated by the fact that there are no clear semantics as to how these specifications translate into information systems to be created to support such process flows.

Alternatively, 'use cases' are sometimes used to depict such flows where an "actor" interacts with the system in a specific manner to accomplish the tasks. This approach also suffers from lack of clear methodology on what details should be made available in these use cases. Further, semantics of translating these specifications into information-systems design are also missing.

In the days prior to the process-chain approach and use-case modeling, typical CASE (computer-aided software engineering) tool approaches would focus on JAD (Joint Application Development) sessions where business users along with technical business analysts would describe a system, primarily based on the underlying conceptual data structures and modules/sub systems that operate against them. The focus was never on processes and hence the business user was always forced to learn a system-based approach to express his requirements.

All these approaches under the umbrella of "Computer-Aided Software Engineering" (CASE) suffered from a common problem of different diagrams/syntax to create the specifications, without standard interpretation or translation semantics to rest of the development-life-cycle activities. This led to the proliferation of interpretations and eventual failure of these specifications to completely drive, first, the development, and later, the maintenance of software systems.

These issues lead to severe problems in managing requirements (i.e., how the requirements are gathered, stored, used, and maintained) from a business-user point of view. Requirements-related rework costs the most in information-systems delivery. Requirements, as specified, should be in a language and representation that makes sense to the business users.

Engineering

Conventional approaches lack definition of application/business architecture. The problems faced by software engineers include, a lack of standard elements to define and maintain proposed business architecture for information systems, and the ability to persist and use these specifications to drive the complete information system life cycle from initial development to deployment and post-implementation maintenance (fixing bugs and adding enhancements).

Information-systems design generally follows the guidelines laid down by an architectural specification. This is greatly influenced by the technologies that will be employed during implementation.

Some conventional approaches lay down a technical architecture specification as set of technology elements, rather than using a technology-independent specification. This approach results in architecture specifications driven and influenced by technology limitations at that point in time. Systems engineered with this approach will require a large amount of rework for technology upgrades when required.

As an example, when client-server systems were in vogue (notice that "client-server" is often referred to as an architecture while it is actually a specification for using the emerging technologies at that point in time), the architecture approach and implementation scheme could have been laid out in a way that, when the transition to 3-tier technologies was attempted, rewrites could have been avoided.

The deficiency in conventional approaches is a lack of a clear set of elements with which a proposed technical architecture is specified, irrespective of technology choices. Even though existing approaches do create a formalism by splitting the general characteristics of systems in terms of presentation, logic-handling and data-persistence layers, it is not complete since these are conceptual elements again related to technologies, rather than requirements of a specification formalism that is independent of technology. What is not laid out is a clear set of elements that an architect should use to instruct the designers on how to proceed with designing under the architectural guidelines. This leads to violations of the guidelines during design and implementation, leading to either rework during development phase or costly repairs after implementation.

Software Construction

Conventional practices in implementing software design suffer from a lack of standard elements to express the requirements and design specification, and a lack of flexible technology-artifact mapping to deliver the specification in chosen technologies. An "artifact" is a type of deliverable that is part of a developed application installed in a particular hardware. Examples of artifacts are .DLL (Dynamic Link Library) files, .exe files, .htm files, and database scripts.

The specification of requirements is carried out using specific templates or elements of a document. Designers have no way of consistently mapping these specifications into the design elements as stipulated by the architectural guidelines. Most conventional case tools and specification tools do not address the link between requirements specification and design specification. It is left to the designers to interpret the requirements in a way suitable for design and implementation. Technical architecture specifications are only used as guidelines.

The elements available to designers are generally covered in object-oriented design approaches through object/class modeling and sequence diagrams for interaction specification. There are other disjoint diagram specifications to represent other aspects of system behavior. These representations are driven from a high-level purist approach to specifying system behavior in a top-down approach.

Implementation teams do not generally have a clear direction on what design artifacts are to be implemented in the various technical layers. This choice is left to the implementer's interpretation keeping in mind architectural guidelines for the project. As an example, when case tools were popular, most of them provided "design work benches" using standard notational diagrams for data structures, subsystems and interactions. They also proceeded to supply code generators for mainframe-based technologies. When client-server technologies arrived, the lack of clear design elements and the mapping approach resulted in these products failing miserably to make the transition to client-server technologies from mainframe-based technologies. The software-development community again had to resort to conventional ways of interpreting design into the chosen technologies for implementation.

The issues discussed above need an approach to first identify the elements corresponding to business architecture, engineering, and construction, and the translation semantics between them.

Schema for Storing an Integrated Software Specification

A schema is provided for representing a process that is to be implemented for execution by a computer system. The schema provides a high level of abstraction in the form of a business functions level that provides flexibility in identifying functions to be performed in an organization independently of implementation options. The schema is used to represent these business functions as rows in a relational database table with attributes of the functions. The syntax of textual descriptions of the business functions in the rows is flexible, allowing easy understanding by members of the organization, such as a business group. In one embodiment, the syntax is driven by the semantics of the business or method to be automated by the computer system. A layered approach is used to convert the high level of abstraction into actual code for execution by the computer system.

In some embodiments, standard elements and the interrelationships form the backbone of a formal schema for storing the product structure evolved during the different phases of the software lifecycle. The schema allows for persisting these structures in any standard database system. All the operational activities during software life cycle are driven with these structures. Recording of the peripheral activities are created as adornments to this backbone structure.

Representing Business Architecture for Information Systems

In some embodiments, the invention includes a method that includes: (1) using a layered approach to defining business architecture irrespective of implementation options, (2) creating standard architectural elements in each of these layers, and (3) using standard structural connective elements to enable "persisting" the specification objects to aid in generating and maintaining the software throughout the complete system lifecycle.

In some embodiments, the invention's application and business architecture is defined in the following five elements: (A) the business functions performed in an organization, (B) the activities performed inside a business function in response to happenings within and from outside the system, (C) the user interfaces used as a set to complete each of activities to capture and retrieve information, (D) the tasks or actions performed to fill, persist and retrieve various elements on the user interfaces, and (E) the business rules that govern each of such tasks.

Each of the five elements is represented by a data structure (in some embodiments these are, for example, five interrelated portions of a single larger data structure), into which data regarding requirements is entered. The data structure, such as a row in a relational database, also contains other information such as due dates, programmer responsible, cost budgets, size, performance, and other attributes useful for producing enterprise software. This data is formulated, constrained, and formatted in such a way as to make programming, testing, planning, and managing easy to do.

Further example attributes include attributes for user interfaces, such as whether to use buttons, radio dials, fields, etc. Attributes for activities may include whether the activity is system or user initiated. A user initiated activity might appear as a menu item, but not appear as a menu item if it is a system initiated activity. A function might be an external function, in which case it might be interfaced to another system for implementation of the function itself. These are just a very few examples of attributes that may be collected to help in producing enterprise software. The attributes are formulated to provide constraints, and to make planning and managing of implementation of the software easy to do. Others will be apparent to those of skill in the art, and may also be dependent on the type processes being specified.

The requirements gathered from one or more business analysts (experts who understand the needs of the business organization) are constrained to a particular format suitable for entry into a data structure The standard architectural elements of such an approach, which correspond to the above five elements, then are (a) Business functions, (b) Business activities, (c) User interfaces or forms, (d) Tasks or actions performed on the user interface, and (e) Business rules.

FIG. 1 is a schema 100 for gathering requirements and for creating and managing enterprise software from the gathered requirements. Schema 100 includes multiple levels of abstraction of requirements. The first level 102 is an application or business architecture level. This level is used to define the high level requirements in context relevant syntax. The levels are stored in a database schema form in one embodiment, such that lower levels, progressing toward actual coding are linked to high levels. A second level 104 is used to represent a technical or design architecture of the first level. It serves as an intermediate link between the first level and a third level 106 represents the actual building blocks and technology specific customization.

The first level is a process expression level. It includes a plurality of elements or units, each of which stores various aspects of specifications derived from the requirements and software built to those specifications. In some embodiments, schema level 102 includes business processes 111 that define the requirements at a level compatible with the thinking processes of business-requirements experts. In some embodiments, business processes 111 are divided into a first five units including business functions 112, business activities 113, user interfaces 114, actions 115, and business rules 116.

An example of a business process might be sales order processing for a business. Business functions 112 would include purchase requisitioning, approval and purchase order dispatch. Business activities might include an acknowledgement, get best quote, release purchase order. User interfaces may be defined in terms of show all pending purchase orders for approval, an approval screen, and others. Actions may include things like fetch next purchase order for approval, link to next page, send acknowledgement, or send rejection.

Business rules might include things like "if no request, tell user x". As can be seen, the first level 102 contains a textual description of the business or other process to be implemented by a computer system or otherwise electronically. The descriptions take the form of text that is very relevant to one who is designing the business process. In one sense, it is an abstract representation of the actual code that will be written, but in another sense, it separates the structure of the implementation from the expression of the process.

Business processes 111 and their associated events 121 represent the operational flow across the organization for which the software is being developed. Events 121, in the form of entry and exit events to the constituent functions, activities, and interfaces are connectors that define flow of control or interfaces between other units. Business activities and their associated events represent the operational flow across a unit within the organization. User interfaces 114 and their associated events 121 represent the specified interface map for the systems and software being developed.

Links 122 are formed from mapping of events 121 that represent interconnections, or from user interfaces. 133 Integration services 123 are formed from mapping of events 121, business rules 116, or methods 135. A second five units represent the design architecture 104, and include, in some embodiments, components 131 that represent the basic software units of this approach, entry points 132, user interfaces, 134 services 134, and methods 135. In some embodiments, each one of the first five units is mapped to a corresponding one of the second five units, e.g., business functions 112 are mapped to components 131, business activities 113 are mapped to entry points 132, user interfaces 114 are mapped to user interfaces 133, action 115 are mapped to services 134, and business rules 116 are mapped to methods 135. In some embodiments, error conditions 136 are provided for methods 135.

In some embodiments, the third level 106 contains building blocks and customization. Data structure artifacts 141 are generated from the events 121 and the components 131, user-interface artifacts 142 are generated from the entry points 132 and the user interfaces 133 of the second five units, and application service artifacts 143 are generated from the services 134 and the methods 135. In some embodiments, application service artifacts 143 are also generated from integrations services 123 and error conditions 136.

Figure 2:
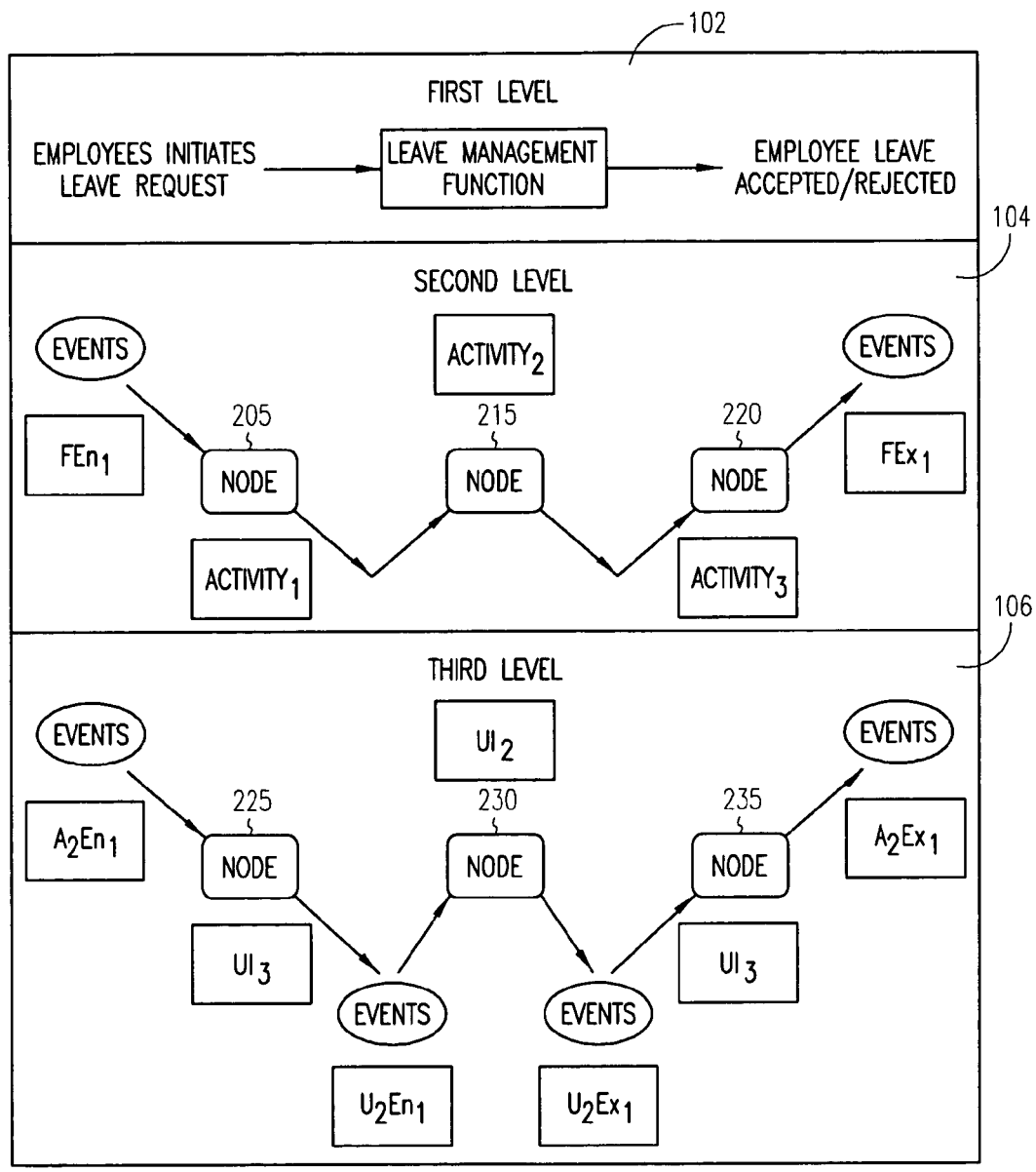
FIG. 2 is a chart 200 of levels used in schema 100 for engineering the enterprise software.

FIG. 2 represents connections within and across levels, which are used as the software is being developed and engineered.

The first level corresponding to level 102 in FIG. 1 in the diagram creates a process flow by depicting entry events and exit events to the constituent functions from/to other functions in the same process or across processes. The standard connective elements (which connect the standard architectural elements) are events that are triggered by and/or handled by the various architectural elements (FEn1, FEx1, AEn1, AEx1, UEn1, UEx1) FEn1 represents an entry event handled by function 1. FEx1 is an exit event generated by function 1. AEn1 is an entry event handled by activity 1. Events are represented by ovals in FIG. 2. AEx1 is an exit event generated by activity 1. UEn1 is an entry event handled by User Interface 1. UEx 1 is an exit event generated by User Interface 1.

The second level 104 for activity flow uses the entry event for the corresponding functions as the start event to create the set of activities and interactions thru events to reach the end events for the function. Each activity node 205, 215 and 220 is expanded along the same principles to depict the User Interface (UI) flow needed to complete the activity. The next level 106 represents tasks at task nodes 225, 230 and 235 on the UI and subsequently the business rules to be implemented for the tasks expanded. Events are again represented by ovals.

This approach creates a complete map of the system behavior up to the business rules/policies level and will be the driver for engaging with customers for whom the code is being written. The nodes translate to relevant nodes in engineering. The events that connect them are classified and translated to information-exchange events (these are implemented as UI look ups, and Data Look ups at the SP level for performing the validations), and transfer-of-control events (these are implemented as integration services across component boundaries and data updates across boundaries for local storage inside the component boundary).

Events are now described with respect to an example business process in FIG. 2. An event is a stimulus that triggers a function/activity/user interface. The function/activity/user interface responds to the stimulus and results in an outcome. The stimulus is referred to as an entry event and the outcome as an exit event. An example of an entry event at the function level is "Employee initiates leave request." The function that responds to this stimulus is a leave-management business function. An example of an exit event is "Employee leave request approved/rejected." UI lookups are user interfaces provided to look up certain reference information in the course of completing a transaction. For example, during the processing of a leave authorization the supervisor could look up the leave balance of the employee. Data lookup is the reference information used to validate data in the database. An example of such lookup is the validation of employee eligibility for the type of leave applied for. Stored-procedure-level look up is used where multiple business rules need to be implemented in a common environment.

An event within the system querying for information is an information-exchange event, e.g., checking an available-to-promise date from a production schedule, or checking on vendor rating for a purchase order creation. A transfer-of-control event is an event within the system that transfers information and control to the next function in a business process, e.g., items ready for packing to be handled by the packing function, or invoice to be raised for item purchased to be handled by accounts payable.

The mapping of the nodes and events to the underlying engineering models complete the packaging and prepares for implementation. For new solutions, mapping is the analysis effort of deciding on the implementation mode for the events with the nodes already defined. Impact analyses or changes will be recorded as a set of events that needs to be added or deleted or enhanced in terms of the information content. The mapping information will be used to create the traced impact on the engineering model elements affected and will form the basis for the changes to be engineered into an existing solution. This component initiates the changes at the process-function level and can go in-depth until the business rules are implemented inside the software.

For a typical application, changes that can impact events at the process and/or activity level provide information for probing impact at the levels below. There can be changes which attribute to the flow and the node in specific. The specification of this attribute provides the connectors to be involved at both ends in an event-managed impact analysis. Subscription and publishing of the information is affected in this impact.

The user has the option of taking up the impacted change provided as side impact, or ignore the suggested changes, based on his ability to assess the impact. An example of impact at the activity level would be flow change. This change flow will result in User Interface(s) that may have addition or deletion of controls/elements in the presentation and subsequent use of the data from these controls/elements in the processing area. So if it impacts the processing further down, the impact is identified by its engineering nodes that need modification. Implementation using business logic will change to accommodate this accepted/suggested modification.

In a case where the leave-management function interacts with the employee-handling function, there could be a change envisaged that the employee eligibility for different leaves is based on employee type. This leads to a change in the signature of the IE event connecting leave management and employee handling. This change in the event at the function interaction level is used to find the possible impact at other levels based on the mapping of this information exchange event at a function level to its implementation details and also to the events at activity, user-interface levels. This could lead to a change in the data exchange between the two use interfaces and also change in the service signature of the leave eligibility service.

The following advantages may result: a single context relevant diagram/syntax may be used for representing a business architecture. Its formal structure provides for persisting the business-architecture specification. Persistence is the storing of the specifications in a data base system so that it could be used by others at any other point in time. This results in a persistent blueprint for driving software engineering and the roll out of the finished information systems. It also allows business-impact analysis and implementation independence.

Representing Technical Architecture

In the approach of the present invention, the technical architecture is specified using the following standard elements: a "component," which, as an architecture element, corresponds to an individual part of a system (for example, the leave-management component).

Components include System Entry Points, Business Objects, Services, Process Sections, Methods, Links, Integration Services, and Interface Business Objects.

The "system entry points" are visual-interface elements, for example, menu items for leave request, leave authorization, etc.

The "business-objects" element deals with the need to store and persist information structures. An example of a business object is the data structure that holds employee information, company policies, leave eligibilities etc.

The "services" element represents the interface structure to interact with the data structures to store and retrieve persisted information.

The "process-sections" elements represent the flow of logic needed to handle a service request.

The "methods" elements are individual logical elements that are invoked during service-request handling directed by the process section specifications, for example, the service for a leave request could trigger methods for employee validations, leave-eligibility validations, etc., whose execution sequence is controlled by the process section.

The "links" elements are a type of interaction element between two visual-interface elements of the system. For example, the UI look up for leave availability from leave authorization screen.

The "integration services" elements are a type of interaction between two components of the system. An example of integration service is posting of leave information to payroll for pay computation.

The "interface business objects" elements are a type interaction between two components of the system. An example of this is employee name lookup based on the employee code.

These elements provide a comprehensive set for some embodiments, sufficient to enable the engineers design the system without violating the architectural guidelines. Interpretation of these architecture elements varies and is based upon the technology choices made for implementation. In fact, technology choices are imposed on the design specifications using these architectural elements only during implementation.

This provides the following advantages: design engineers, by using this approach, are presented with a clear set of architectural elements for specification. The approach does not require the designers to consider technology choices during development phase. Since the elements are not technology dependent, implementers could be instructed on specific implementation approach based on technology choices against each of the elements designed.

Mapping Business and Technical Architecture Elements to Implementation Technologies The problem addressed by the present invention is, given a set of requirements and technical-design elements, how do designers and implementers apply choices within the architectural guidelines to arrive at the implementation approach.

In some embodiments of the present invention, the requirements specification elements include business functions, business activities, user interfaces or forms, tasks or actions performed on the user interface, business rules and events (which connect the other five elements.)

Design-specification elements may include components, system entry points, business objects, services, process section, methods, links, integration services and interface business objects.

For example, in some embodiments, a sample technology implementation architecture in Microsoft technology set will be (A) Presentation supported by internet pages and the web server, (B) Business logic supported by middle-tier transaction-enabled COM objects, (C) Database layer supported by SQL server RDBMS, and (D) Packaging as COM+ packages for each subsystem.

In some embodiments, Presentation artifacts communicate to the middle tier objects to store and retrieve data from the database layer. Typical implementation guidelines would specify the technology platform features that would be used including communication from presentation to back end using XML documents. The guideline would specify that the distributed transaction capabilities of COM+ should be used.

Given these requirements for implementation with Microsoft technology platform, the mapping is given in the following Table 1.

TABLE 1

| Requirements specification Business architecture elements | Mapped Design-specification provides corresponding Technical architecture elements | Implementation in the sample technology architecture (for example, Microsoft-based technology) |
|---|---|---|
| Business functions | Components, Business Objects | Tables in a RDBMS-like MS SQL server |
| Business activities | System entry points | Menu items implemented using ASP, HTM |
| User interfaces or forms | Screens | HTML pages, Active server pages |
| Tasks or actions performed on the user interface | Services | COM+ DLLs implementing the service behavior using Visual basic |
| Business rules | Process sections, Methods | Stored procedure for business logic, VB code for business logic |
| Events | Links, Integration services, Interface business objects | Links are implemented as Hyperlinks in HTM for UI lookup. Interface business objects are implemented as stored procedures, views, for data lookup, Integration services are implemented as COM+ DLLs for integration with external systems. |

For different technology platforms and recommendations, the mapping can be suitably specified to ensure implementation does not violate the architecture guidelines.

This provides the following advantages: a clear technology-implementation mapping that preserves adherence to architecture guidelines. Future re-implementation in other technology platforms can be driven from the same set of specifications and specific mapping. The clear separation of concern between the architect, engineer and implementer leads to better productivity and discipline. The architect's concerns now focus on business needs without being constrained by the implementation methodology or technology. The engineer's concerns are now to design the system to address the business needs without being constrained by technology. The implementer's concerns are now for developing the system using a particular technology to address the business needs based on the design.

Figure 3:
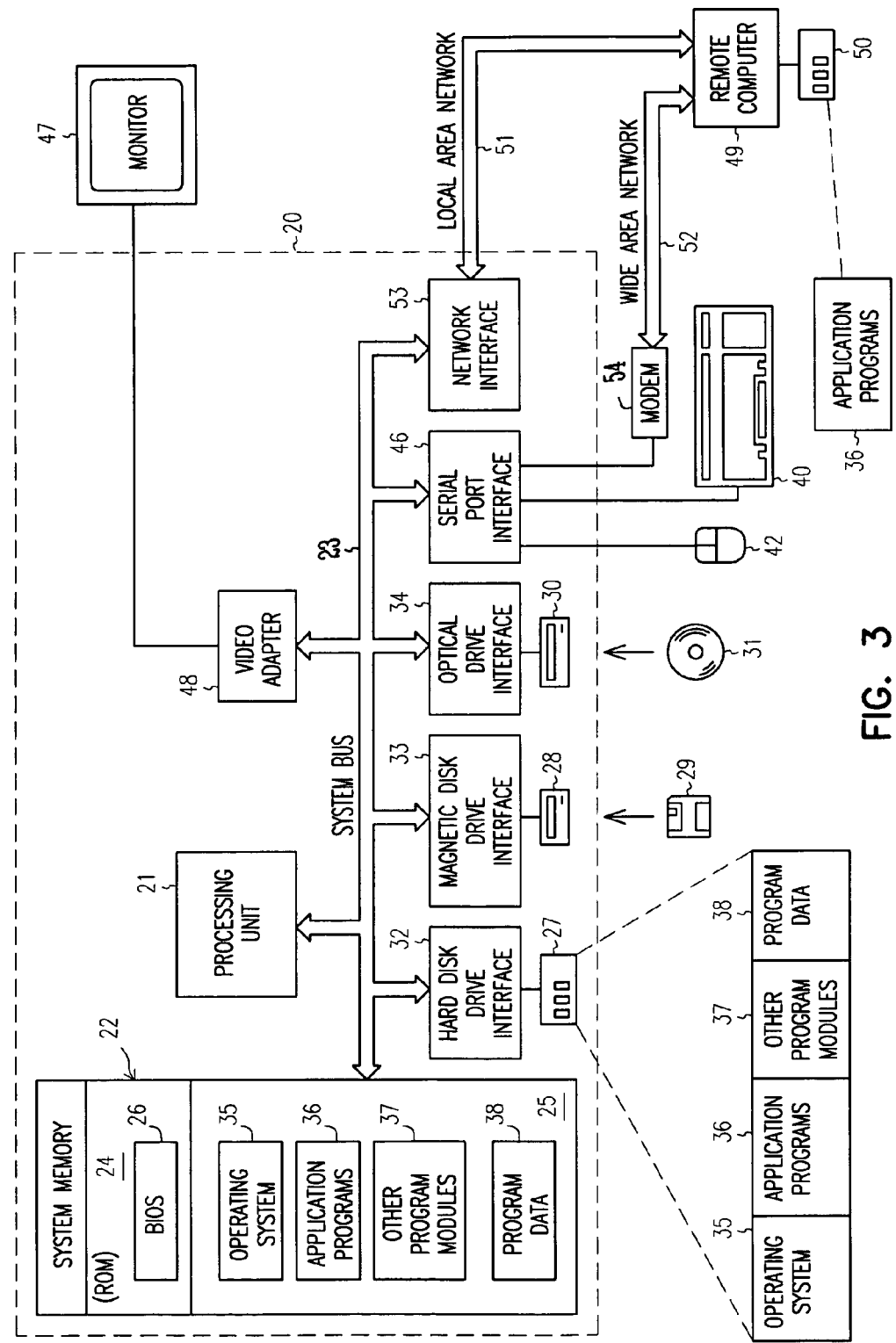
FIG. 3 is a schematic block diagram 300 of an exemplary information-processing system that can be used to run some or all portions of the invention.

FIG. 3 is an overview diagram of a hardware and operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (RONs), redundant arrays of independent disks (e.g., RAID storage devices) can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
   compartmentalizing a business-software architecture into multiple first specification units described in a common database schema including software specifications based on standard architecture elements corresponding to business functions, business activities, user interfaces, actions, and business rules, wherein the business-software architecture is derived from business requirements, and wherein each of the business functions comprise business functions performed in a business process, and wherein each of the business activities comprise activities performed in each of the business functions in response to events on business function, and wherein each of the user interfaces comprises semantics to capture and retrieve information for each business activity, and wherein each of the actions comprise tasks performed in each of the user interfaces, and wherein each of the business rules comprises rules that govern each of the tasks;
   compartmentalizing a design architecture into multiple second specification units of the database schema corresponding to components, system entry points, user interfaces, services, and methods, wherein the design architecture is designed under design architectural guidelines, and wherein each of the components correspond to an individual business function of the business process, system entry points are visual-interface elements in each of the user interfaces, services represent interface structure of the system entry points to interact with data structures, and methods represent logical business rules that are invoked in handling each of the services;
   defining events that connect the first specification units, wherein events comprises entry events and exit events, and wherein each of the entry events is a stimulus that triggers a business function, a business activity, or a user interface and each of the exit events is a response from the respective business function, business activity, or user interface to the stimulus;
   mapping each one of the first-specification units to a corresponding one of the second specification units using the events;
   generating data structures artifacts from the defined events and the components;
   generating user-interface artifacts from the system entry points and the user interfaces of the second specification units; and
   generating application service artifacts from the services and the methods.

2. The method of claim 1, further comprising:
   defining a set of error conditions; and
   generating application service artifacts from the error conditions.

3. A method comprising:
   standardizing a plurality of business-software and design architecture elements of an information system, wherein the business-software and design architecture elements are derived from business requirements and design architecture guidelines, respectively, and wherein the step of standardizing comprises:
      compartmentalizing the business-software architecture into multiple first specification units described in a common database schema including software specifications based on standard architecture elements corresponding to business functions, business activities, user interfaces, actions, and business rules, and wherein each of the business functions comprise business functions performed in a business process, and wherein each of the business activities comprise activities performed in each of the business functions in response to events on business function, and wherein each of the user interfaces comprises semantics to capture and retrieve information for each business activity, and wherein each of the actions comprise tasks performed in each of the user interfaces, and wherein each of the business rules comprises rules that govern each of the tasks; and
      compartmentalizing the design architecture into multiple second specification units of the database schema corresponding to components, system entry points, user interfaces, services, and methods, wherein each of the components correspond to an individual business function of the business process, system entry points are visual-interface elements in each of the user interfaces, services represent interface structure of the system entry points to interact with data structures, and methods represent logical business rules that are invoked in handling each of the services;
   finding attributes for each one of the business-software and design architecture elements based on technology, wherein events comprises entry events and exit events, and wherein each of the entry events is a stimulus that triggers a business function, a business activity, or a user interface and each of the exit events is a response from the respective business function, business activity, or user interface to the stimulus;
   creating a database model to store specifications set out based on the standard business-software and design architecture elements and the attributes; and
   generating data structure artifacts from the events and the components in the created database model, user-interface artifacts from the system entry points and the user interfaces of the second specification units in the created database model, and application service from the services and the methods in the created database model.

4. A method for collecting, organizing, and storing software specification information generated during various phases of a software lifecycle in an information system comprising:
   forming standard business-software and design architecture elements in each layer that describe and maintain the information system, wherein the business-software and design architecture elements are derived from business requirements and design architecture guidelines, respectively, and wherein the step of forming comprises:
      compartmentalizing the business-software architecture into multiple first specification units described in a common database schema including software specifications based on standard architecture elements corresponding to business functions, business activities, user interfaces, actions, and business rules, and wherein each of the business functions comprise business functions performed in a business process, and wherein each of the business activities comprise activities performed in each of the business functions in response to events on business function, and wherein each of the user interfaces comprises semantics to capture and retrieve information for each business activity, and wherein each of the actions comprise tasks performed in each of the user interfaces, and wherein each of the business rules comprises rules that govern each of the tasks; and compartmentalizing the design architecture into multiple second specification units of the database schema corresponding to components, system entry points, user interfaces, services, and methods, wherein each of the components correspond to an individual business function of the business process, system entry points are visual-interface elements in each of the user interfaces, services represent interface structure of the system entry points to interact with data structures, and methods represent logical business rules that are invoked in handling each of the services;

connecting the standard business-software and design architecture elements using standard structural collective events that aid in using the standard business-software and design architecture elements to complete the software lifecycle, wherein events comprises entry events and exit events, and wherein each of the entry events is a stimulus that triggers a business function, a business activity, or a user interface and each of the exit events is a response from the respective business function, business activity, or user interface to the stimulus;

finding attributes for each of the business-software and design architecture elements based on technology; and creating a database model to store the software specifications based on the standard business-software and design architecture elements and attributes.

5. An apparatus comprising:

a processing unit;

a memory operatively coupled to the processing unit;

a data structure stored in the memory, wherein the data structure identifies layers that define the information system;

standard business-software and design architecture elements in each layer that describe and maintain the information system, wherein the business-software and design architecture elements are derived from business requirements and design architecture guidelines, respectively, and wherein the business-software architecture is compartmentalized into multiple first specification units described in a common database schema including software specifications based on standard architecture elements corresponding to business functions, business activities, user interfaces, actions, and business rules, and wherein each of the business functions comprise business functions performed in a business process, and wherein each of the business activities comprise activities performed in each of the business functions in response to events on business function, and wherein each of the user interfaces comprises semantics to capture and retrieve information for each business activity, and wherein each of the actions comprise tasks performed in each of the user interfaces, and wherein each of the business rules comprises rules that govern each of the tasks; and the design architecture is compartmentalized into multiple second specification units of the database schema corresponding to components, system entry points, user interfaces, services, and methods, wherein each of the components correspond to an individual business function of the business process, system entry points are visual-interface elements in each of the user interfaces, services represent interface structure of the system entry points to interact with data structures, and methods represent logical business rules that are invoked in handling each of the services;

standard connective elements that connect the standard business-software and design architecture elements using the standard structural collective events to aid in using the standard business-software and design architecture elements to complete the software lifecycle, wherein events comprises entry events and exit events, and wherein each of the entry events is a stimulus that triggers a business function, a business activity, or a user interface and each of the exit events is a response from the respective business function, business activity, or user interface to the stimulus;

attributes for each of the business-software and design architecture elements based on technology, wherein attributes comprises building blocks as code to implement the information system; and a database model to store the software specifications based on the standard business-software and design architecture elements, the standard connective elements, and attributes.

6. An apparatus comprising:

a processing unit;

a memory operatively coupled to the processing unit;

a data structure stored in the memory, the data structure including layers that define the information system;

standard business-software and design architecture elements in each layer that describe and maintain the information system, wherein the business-software and design architecture elements are derived from business requirements and design architecture guidelines, respectively, and wherein the business-software architecture is compartmentalized into multiple first specification units described in a common database schema including software specifications based on standard architecture elements corresponding to business functions, business activities, user interfaces, actions, and business rules, and wherein each of the business functions comprise business functions performed in a business process, and wherein each of the business activities comprise activities performed in each of the business functions in response to events on business function, and wherein each of the user interfaces comprises semantics to capture and retrieve information for each business activity, and wherein each of the actions comprise tasks performed in each of the user interfaces, and wherein each of the business rules comprises rules that govern each of the tasks; and the design architecture is compartmentalized into multiple second specification units of the database schema corresponding to components, system entry points, user interfaces, services, and methods, wherein each of the components correspond to an individual business function of the business process, system entry points are visual-interface elements in each of the user interfaces, services represent interface structure of the system entry points to interact with data structures, and methods represent logical business rules that are invoked in handling each of the services;

standard connective elements that connect the standard business-software and design architecture elements to complete the software lifecycle, wherein events comprises entry events and exit events, and wherein each of the entry events is a stimulus that triggers a business function, a business activity, or a user interface and each of the exit events is a response from the respective business function, business activity, or user interface to the stimulus;

attributes for each of the business-software and design architecture elements based on technology, wherein attributes comprises building blocks as code to implement the information system; and a database schema to store the software specifications based on the standard business-software and design architecture elements.

7. A computer-readable data structure stored on a computer readable medium comprising:

layers that define the information system, wherein the data structure includes the layers;

standard business-software and design architecture elements in each layer that describe and maintain the information system, wherein the business-software and design architecture elements are derived from business requirements and design architecture guidelines, respectively, and wherein the business-software architecture is compartmentalized into multiple first specification units described in a common database schema including software specifications based on standard architecture elements corresponding to business functions, business activities, user interfaces, actions, and business rules, and wherein each of the business functions comprise business functions performed in a business process, and wherein each of the business activities comprise activities performed in each of the business functions in response to events on business function, and wherein each of the user interfaces comprises semantics to capture and retrieve information for each business activity, and wherein each of the actions comprise tasks performed in each of the user interfaces, and wherein each of the business rules comprises rules that govern each of the tasks; and the design architecture is compartmentalized into multiple second specification units of the database schema corresponding to components, system entry points, user interfaces, services, and methods, wherein each of the components correspond to an individual business function of the business process, system entry points are visual-interface elements in each of the user interfaces, services represent interface structure of the system entry points to interact with data structures, and methods represent logical business rules that are invoked in handling each of the services;

standard connective elements that connect the standard business-software and design architecture elements using standard structural collective events to aid in using the standard architecture elements to complete the software lifecycle, wherein events comprises entry events and exit events, and wherein each of the entry events is a stimulus that triggers a business function, a business activity, or a user interface and each of the exit events is a response from the respective business function, business activity, or user interface to the stimulus;

attributes for each of the business-software and design architecture elements based on technology, wherein attributes comprises building blocks as code to implement the information system; and a database schema to store the software specifications based on the standard business-software and design architecture elements.

8. A computer-readable medium comprising instructions available thereon that when executed by a computing platform results in executing a method comprising:

identifying three or more layers that define the information system;

forming one or more standard business-software and design architecture elements in each layer that describe and maintain the information system, wherein the business-software and design architecture elements are derived from business requirements and design architecture guidelines, respectively, and wherein the step of forming comprises:

compartmentalizing the business-software architecture into multiple first specification units described in a common database schema including software specifications based on standard architecture elements corresponding to business functions, business activities, user interfaces, actions, and business rules, and wherein each of the business functions comprise business functions performed in a business process, and wherein each of the business activities comprise activities performed in each of the business functions in response to events on business function, and wherein each of the user interfaces comprises semantics to capture and retrieve information for each business activity, and wherein each of the actions comprise tasks performed in each of the user interfaces, and wherein each of the business rules comprises rules that govern each of the tasks; and compartmentalizing the design architecture into multiple second specification units of the database schema corresponding to components, system entry points, user interfaces, services, and methods, wherein each of the components correspond to an individual business function of the business process, system entry points are visual-interface elements in each of the user interfaces, services represent interface structure of the system entry points to interact with data structures, and methods represent logical business rules that are invoked in handling each of the services;

connecting the standard business-software and design architecture elements using standard structural collective events that aid in using the one or more standard business-software and design architecture elements to complete the software lifecycle, wherein events comprises entry events and exit events, and wherein each of the entry events is a stimulus that triggers a business function, a business activity, or a user interface and each of the exit events is a response from the respective business function, business activity, or user interface to the stimulus;

finding attributes for each of the business-software and design architecture elements based on technology, wherein said step of finding attributes comprises providing building blocks as code to implement the information system; and creating a database model to store the software specifications based on the standard business-software and design architecture elements; and generating data structure artifacts from the events and the components in the created database model, user interface artifacts from the system entry points and the user interfaces of the second specification units in the created database model, and application service from the services and the methods in the created database model.

9. A method comprising:

standardizing a plurality of architecture elements of an information system, wherein said step of standardizing comprises representing a process to be automated at a top level by context representative syntax in a common database schema including software specifications based on the standard business-software and design architectural elements, and wherein the business-software and design architecture elements are derived from business requirements and design architecture guidelines, respectively, and wherein the top level comprises business functions, business activities, user interfaces, actions and business rules, and wherein each of the business functions comprise business functions performed in a business process, and wherein each of the business activities comprise activities performed in each of the business functions in response to events on business function, and wherein each of the user interfaces comprises semantics to capture and retrieve information for each business activity, and wherein each of the actions comprise tasks performed in each of the user interfaces, and wherein each of the business rules comprises rules that govern each of the tasks, and wherein top level further comprises events and links, and wherein the top level business functions, activities and interfaces that are triggered by events, and wherein events comprises entry events and exit events, and wherein each of the entry events is a stimulus that triggers a business function, a business activity, or a user interface and each of the exit events is a response from the respective business function, business activity, or user interface to the stimulus;

finding attributes for each of the architecture elements based on technology, wherein said step of finding attributes comprises providing building blocks at a lower level of the schema as code to implement the automated process;

creating a database model to store the software specifications set out based on the standard architecture elements, wherein said step of creating a database comprises providing an intermediate level of the schema to interface between the top level and the lower level, and wherein the intermediate level comprises components, entry points, user interfaces, services and methods, and wherein the intermediate level comprises components that are related to business functions, and wherein the levels are coupled by specified relationships in the database, and wherein each of the components correspond to an individual business function of the business process, system entry points are visual-interface elements in each of the user interfaces, services represent interface structure of the system entry points to interact with data structures, and methods represent logical business rules that are invoked in handling each of the services; and generating data structure artifacts from the events and the components in the created database model, user interface artifacts from the system entry points and the user interfaces of the second specification units in the created database model, and application service from the services and the methods in the created database model.

10. A method comprising:

compartmentalizing a business-software architecture into first specification units of a business software system representable in a common database including software specifications based on the standard architectural elements and corresponding to business functions, business activities, user interfaces, actions, and business rules, wherein the business-software architecture is derived from business requirements, and wherein each of the business functions comprise business functions performed in a business process, and wherein each of the business activities comprise activities performed in each of the business functions in response to events on business function, and wherein each of the user interfaces comprises semantics to capture and retrieve information for each business activity, and wherein each of the actions comprise tasks performed in each of the user interfaces, and wherein each of the business rules comprises rules that govern each of the tasks;

compartmentalizing a design architecture into a second five specification units of the database corresponding to components, system entry points, user interfaces, services, and methods, wherein the design architecture is designed under design architectural guidelines, and wherein each of the components correspond to an individual business function of the business process, system entry points are visual-interface elements in each of the user interfaces, services represent interface structure of the system entry points to interact with data structures, and methods represent logical business rules that are invoked in handling each of the services;

defining events that connect the first specification units, wherein events comprises entry events and exit events, and wherein each of the entry events is a stimulus that triggers a business function, a business activity, or a user interface and each of the exit events is a response from the respective business function, business activity, or user interface to the stimulus;

mapping each one of the first specification units to a corresponding one of the second specification units;

generating data structures artifacts from the defined events and the components;

generating user-interface artifacts from the system entry points and the user interfaces of the second specification units; and generating application service artifacts from the services and the methods.

\* \* \* \* \*

UNITED STATES PATENT AND TRADEMARK OFFICE
CERTIFICATE OF CORRECTION

PATENT NO. : 7,640,251 B2 Page 1 of 1
APPLICATION NO. : 10/967525
DATED : December 29, 2009
INVENTOR(S) : Parthasarathy Sundararajan et al.

It is certified that error appears in the above-identified patent and that said Letters Patent is hereby corrected as shown below:

Title Pg, Item (73) Assignee: to read

--Ramco Systems Limited, Chennai, Tamil Nadu (IN)--

In Specification

In paragraph 11, line 59-60, change
"(e.g. RAID storage devices) can be used" to --(e.g. RAID storage devices) and the like, can be used--

Signed and Sealed this

Sixth Day of April, 2010

David J. Kappos
*Director of the United States Patent and Trademark Office*